US011015135B2

(12) United States Patent
Yu et al.

(10) Patent No.: US 11,015,135 B2
(45) Date of Patent: May 25, 2021

(54) REDUCED FOULING OF HYDROCARBON OIL

(71) Applicant: BL Technologies, Inc., Minnetonka, MN (US)

(72) Inventors: Guangzhe Yu, The Woodlands, TX (US); Xiomara Price, The Woodlands, TX (US); Roberto M. Gutierrez, The Woodlands, TX (US); Anthony Fields, The Woodlands, TX (US); Bryan Crom, The Woodlands, TX (US); Guoliang Wang, Shanghai (CN); Nimeshkumar Kantilal Patel, The Woodlands, TX (US); Xiaoan Xie, Shanghai (CN)

(73) Assignee: BL Technologies, Inc., Minnetonka, MN (US)

( * ) Notice: Subject to any disclaimer, the term of this patent is extended or adjusted under 35 U.S.C. 154(b) by 0 days.

(21) Appl. No.: 16/326,413

(22) PCT Filed: May 26, 2017

(86) PCT No.: PCT/US2017/034703
§ 371 (c)(1),
(2) Date: Feb. 19, 2019

(87) PCT Pub. No.: WO2018/038781
PCT Pub. Date: Mar. 1, 2018

(65) Prior Publication Data
US 2019/0203131 A1  Jul. 4, 2019

Related U.S. Application Data

(60) Provisional application No. 62/473,744, filed on Mar. 20, 2017, provisional application No. 62/379,400, filed on Aug. 25, 2016.

(51) Int. Cl.
*C10G 75/04* (2006.01)
*C10G 75/02* (2006.01)
(Continued)

(52) U.S. Cl.
CPC ............... *C10G 75/04* (2013.01); *C10G 9/12* (2013.01); *C10G 75/02* (2013.01); *C08L 79/02* (2013.01); *C10G 2300/205* (2013.01)

(58) Field of Classification Search
None
See application file for complete search history.

(56) References Cited

U.S. PATENT DOCUMENTS 2,345,543 A   3/1944 Wohnsiedler et al.
2,920,030 A   1/1960 Thompson
(Continued)

FOREIGN PATENT DOCUMENTS

CA   1131152 A1   9/1982
CA   1329164 C    5/1994
(Continued)

OTHER PUBLICATIONS

International Search Report for Intl. Appl. No. PCT/US2017/034703 dated Jul. 24, 2017, pp. 1-3.
(Continued)

*Primary Examiner* — Tam M Nguyen
(74) *Attorney, Agent, or Firm* — Armstrong Teasdale, LLP

(57) ABSTRACT

Antifoulant compositions and methods are used for inhibiting fouling on structural parts of a system exposed to a fluid hydrocarbon or petrochemical stream. Polyamine antifoulants are added to such systems. The polyamine antifoulants may be conjointly used with dispersants and/or fatty acids. The fatty acids have been found to reduce thermal degradation of the polyamine antifoulants.

11 Claims, 2 Drawing Sheets

(51) Int. Cl.
*C10G 9/12* (2006.01)
*C08L 79/02* (2006.01)

(56) References Cited

U.S. PATENT DOCUMENTS

| | | |
|---|---|---|
| 3,261,774 A | 7/1966 | Newkirk et al. |
| 3,328,283 A | 6/1967 | Godar |
| 3,328,285 A | 6/1967 | Godar |
| 3,364,130 A | 1/1968 | Barnum et al. |
| 3,380,909 A | 4/1968 | Lee |
| 3,390,073 A | 6/1968 | Godar et al. |
| 3,546,097 A | 12/1970 | Tupper |
| 3,558,470 A | 1/1971 | Gillespie et al. |
| 3,567,623 A | 3/1971 | Hagney |
| 3,574,088 A | 4/1971 | Bsharah et al. |
| 3,645,886 A | 2/1972 | Gillespie et al. |
| 3,666,656 A | 5/1972 | Stanley |
| 3,772,182 A | 11/1973 | Hubbard |
| 3,790,496 A | 2/1974 | Hausler |
| 3,819,328 A | 6/1974 | Go |
| 4,200,518 A | 4/1980 | Mulvany |
| 4,397,737 A | 8/1983 | Kray |
| 4,425,223 A | 1/1984 | Miller |
| 4,431,514 A | 2/1984 | Ferm |
| 4,435,273 A | 3/1984 | Ferm et al. |
| 4,444,566 A | 4/1984 | Crawford et al. |
| 4,692,237 A | 9/1987 | Hsu et al. |
| 4,752,374 A | 6/1988 | Reid |
| 4,804,456 A | 2/1989 | Forester |
| 4,810,354 A | 3/1989 | Roling et al. |
| 4,828,674 A | 5/1989 | Forester |
| 4,835,206 A | 5/1989 | Farrar et al. |
| 4,900,427 A | 2/1990 | Weers et al. |
| 5,080,779 A | 1/1992 | Awbrey |
| 5,110,997 A | 5/1992 | Dickakian |
| 5,114,566 A | 5/1992 | Naeger et al. |
| 5,171,420 A | 12/1992 | Forester |
| 5,171,421 A | 12/1992 | Forester |
| 5,173,213 A | 12/1992 | Miller et al. |
| 5,176,847 A | 1/1993 | Kremer |
| 5,266,186 A | 11/1993 | Kaplan |
| 5,292,425 A | 3/1994 | Forester |
| 5,368,777 A | 11/1994 | Forester |
| 5,468,367 A | 11/1995 | Dickakian |
| 5,504,063 A | 4/1996 | Becker et al. |
| 5,556,575 A | 9/1996 | Babaian Kibala et al. |
| 5,614,081 A | 3/1997 | Carey et al. |
| 5,770,041 A | 6/1998 | Lewis et al. |
| 5,783,109 A | 7/1998 | Sawhney |
| 5,851,377 A | 12/1998 | Bush |
| 6,153,724 A | 11/2000 | Hollingsworth |
| 6,379,587 B1 | 4/2002 | Chen |
| 7,005,087 B2 | 2/2006 | Tong |
| 7,329,635 B2 | 2/2008 | Dickakian et al. |
| 7,595,428 B2 | 9/2009 | Ueda et al. |
| 7,674,365 B2 | 3/2010 | Banavali et al. |
| 7,857,871 B2 | 12/2010 | Martin et al. |
| 8,378,040 B2 | 2/2013 | Markel et al. |
| 8,507,580 B2 | 8/2013 | Hara et al. |
| 8,557,939 B2 | 10/2013 | Hara et al. |
| 8,598,291 B2 | 12/2013 | Hara et al. |
| 8,951,409 B2 | 2/2015 | Ng et al. |
| 9,212,326 B2 | 12/2015 | Ng et al. |
| 9,290,584 B2* | 3/2016 | Ng .................. C10G 75/04 |
| 9,334,460 B2* | 5/2016 | Ng .................. C10L 10/04 |
| 9,441,171 B2* | 9/2016 | Ng .................. C08F 8/32 |
| 2002/0049354 A1 | 4/2002 | Lin et al. |
| 2005/0130856 A1* | 6/2005 | Svarcas .................. C10M 163/00 508/454 |
| 2005/0139174 A1* | 6/2005 | Cleveland .............. C10L 10/16 123/1 A |
| 2006/0120913 A1 | 6/2006 | Wuest |
| 2009/0217570 A1 | 9/2009 | Hobson et al. |
| 2009/0226729 A1 | 9/2009 | Niimoto et al. |
| 2009/0238811 A1* | 9/2009 | McDaniel ............... C09D 5/30 424/94.2 |
| 2010/0038290 A1 | 2/2010 | Wang et al. |
| 2010/0170829 A1* | 7/2010 | Ng ........................ C09K 15/30 208/48 AA |
| 2010/0196986 A1 | 8/2010 | Laursen et al. |
| 2011/0166259 A1* | 7/2011 | Butikofer .......... C08G 59/4042 523/401 |
| 2013/0312320 A1 | 11/2013 | Walter |
| 2014/0262950 A1* | 9/2014 | Ng ............................ C08F 8/32 208/177 |
| 2014/0275433 A1* | 9/2014 | Ng ............................ C08F 8/04 525/333.7 |
| 2014/0275663 A1* | 9/2014 | Brons ....................... C08F 8/46 585/3 |
| 2014/0378718 A1 | 12/2014 | Gu et al. |
| 2015/0191645 A1 | 7/2015 | Levey et al. |
| 2015/0218468 A1 | 8/2015 | Ovaskainen et al. |
| 2015/0337143 A1 | 11/2015 | Bressy et al. |
| 2016/0075649 A1* | 3/2016 | Ng ........................ C10L 1/2364 548/520 |

FOREIGN PATENT DOCUMENTS

| | | |
|---|---|---|
| CN | 1218095 A | 6/1999 |
| CN | 1804000 A | 7/2006 |
| CN | 101654628 A | 2/2010 |
| CN | 102732891 A | 10/2012 |
| CN | 103721749 A | 4/2014 |
| CN | 105273703 A | 1/2016 |
| DE | 3405822 A1 | 8/1985 |
| EP | 0087277 A2 | 8/1983 |
| EP | 632121 A2 | 1/1995 |
| EP | 2297255 A1 | 3/2011 |
| EP | 2688837 A1 | 1/2014 |
| EP | 2748290 A1 | 7/2014 |
| EP | 2807925 A1 | 12/2014 |
| EP | 2855642 A1 | 4/2015 |
| FR | 1598880 A | 7/1970 |
| FR | 2559789 A1 | 8/1985 |
| GB | 2153841 A | 8/1985 |
| GB | 2486255 A | 6/2012 |
| JP | H10-45512 A | 2/1998 |
| JP | H10-182310 A | 7/1998 |
| JP | H11-322763 A | 11/1999 |
| JP | 2002220581 A | 8/2002 |
| JP | 2005213369 A | 8/2005 |
| JP | 2008001896 A | 1/2008 |
| JP | 2008001897 A | 1/2008 |
| JP | 2014005353 A | 1/2014 |
| WO | 1995020637 A2 | 8/1995 |
| WO | 2000/01785 A1 | 1/2000 |
| WO | 2010/019545 A1 | 2/2010 |
| WO | 2014/123736 A2 | 8/2014 |
| WO | 2014/143506 A1 | 9/2014 |
| WO | 2017019825 A1 | 2/2017 |

OTHER PUBLICATIONS

Written Opinion for Intl. Appl. No. PCT/US2017/034703 dated Jul. 31, 2017, pp. 1-7.

* cited by examiner

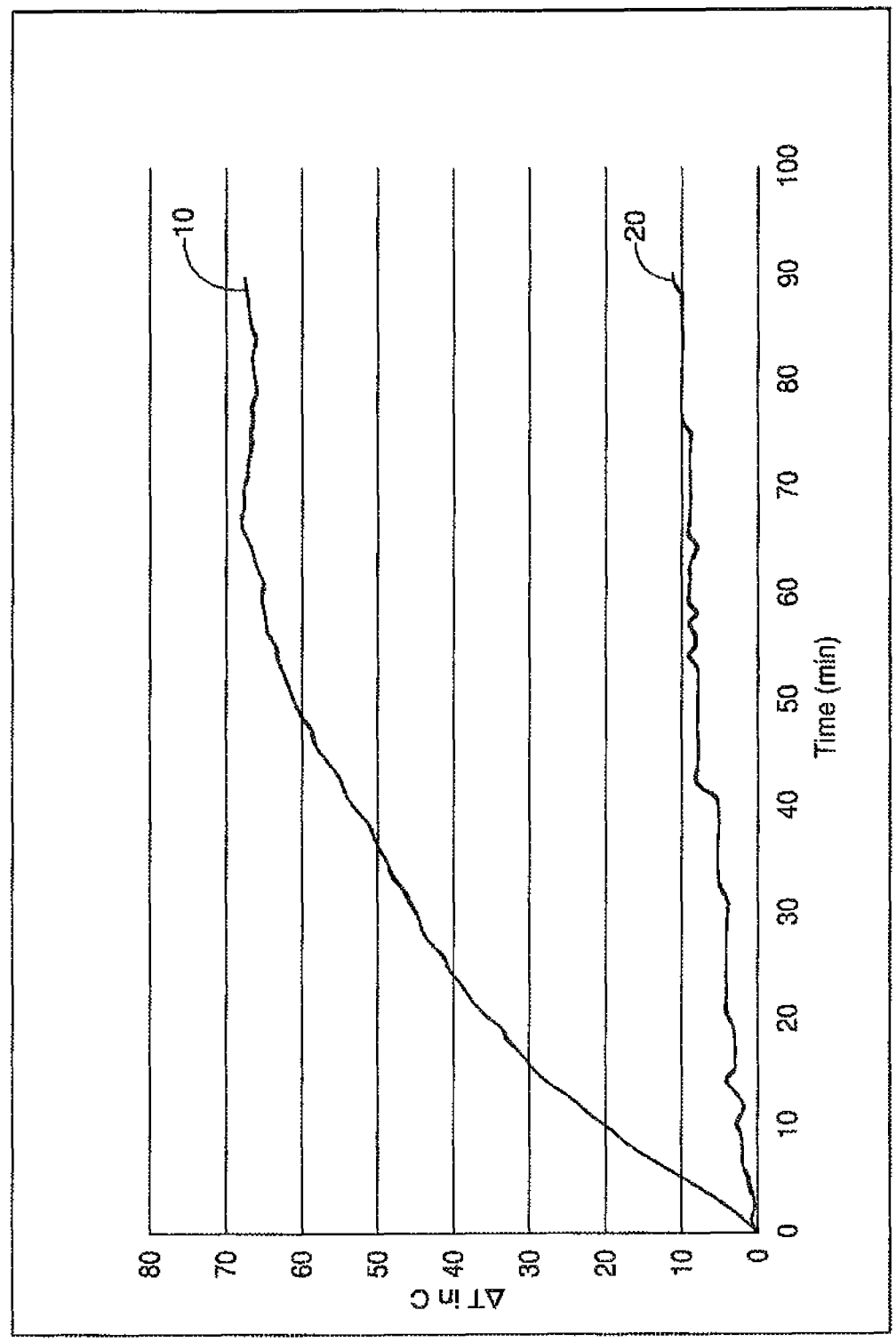

REDUCED FOULING OF HYDROCARBON OIL

CROSS REFERENCE TO RELATED APPLICATIONS

This application claims priority to PCT Appl. Serial No. PCT/US2017/034703, filed May 26, 2017, which claims the benefit of U.S. Provisional Patent Application Ser. No. 62/379,400, filed Aug. 25, 2016, and U.S. Provisional Patent Application Ser. No. 62/473,744, filed Mar. 20, 2017, the entireties of which are incorporated herein by reference.

FIELD OF INVENTION

The present invention pertains to methods and compositions for providing antifoulant protection for petroleum hydrocarbons or petrochemicals during processing thereof at elevated temperatures.

BACKGROUND OF THE INVENTION

Petroleum hydrocarbons, petrochemicals, and their feedstocks are commonly heated to temperatures ranging from 100° F. to about 1,000° F. during processing. Similarly, such petroleum hydrocarbons are frequently employed as heating mediums on the "hot side" of heating and heat exchange systems such as vacuum tower bottoms and slurry systems. In both instances, the petroleum hydrocarbon liquids are subjected to elevated temperatures which produce a separate phase known as fouling deposits within the petroleum hydrocarbon. In all cases, these deposits are undesirable by-products. In many processes, the deposits reduce the bore of conduits and vessels to impede process throughput, impair thermal transfer, and clog filter screens, valves and traps. In the case of heat exchange systems, the deposits form an insulating layer upon the available surfaces to restrict heat transfer and necessitate frequent shutdowns for cleaning. Moreover these deposits reduce throughput, which of course, results in a loss of capacity with a drastic effect in the yield of finished product. Accordingly, these deposits have caused considerable concern to the industry.

Fouling processes are particularly severe in refineries processing so-called "Tight Oils". These tight oils refer to light crude oil that has been produced from low permeability formations such as shale, and "tight sands" in many geographic areas including the U.S., Russia, China, Argentina, Libya, etc. Problems with respect to tight oil fouling can be severe leading to equipment malfunction and occasional refinery shut downs. One particular area of concern is furnace fouling which adversely affects refinery throughput. Such tight oil fouling has been difficult to treat with many of the conventional antifouling treatments performing poorly in this environment.

SUMMARY OF THE INVENTION

Methods and compositions are provided to inhibit fouling on at least one structural part of a system exposed to a fluid hydrocarbon or petrochemical stream. The methods comprise adding a polyamine compound to the fluid hydrocarbon or petrochemical stream. In certain embodiments, the polyamine is an alkylene polyamine represented by the formula:

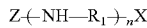

wherein $R_1$ is an alkylene group having from about 1 to about 10 carbon atoms and n is from about 1 to 200,000. X is H, or $NH_2$, or a hydrocarbyl group having up to 30 carbon atoms, Z is H, or $NH_2$, or a hydrocarbyl group having up to 30 carbon atoms. In some embodiments, X and Z, independently, may be a hydrocarbyl group having 10 or fewer carbon atoms.

Exemplary polyamines comprise ethylene diamine or polyethylene polyamines. In certain instances, the polyethylene polyamine may be selected from the group consisting of diethylenetriamine (DETA); triethylenetetramine (TETA); tetraethylenepentamine (TEPA); pentaethylenehexamine (PEHA); hexamethyleneheptamine (HEHA); and mixtures thereof. In some embodiments, the polyethylene polyamine has the formula $NH_2 CH_2 CH_2 (NH CH_2 CH_2)_5 NH_2$.

In certain exemplary embodiments, the polyamine may comprise a polyethylenimine or a polypropylenimine. In other aspects of the invention, the polyethylene polyamine may be reacted with an isocyanate or with propylene oxide.

In a further illustrative embodiment, the polyamine antifoulant (AF) is a reaction product of an ephihalohydrin or ethylene dichloride with an amine reactant. In some cases, the amine reactant may comprise a secondary amine, including the polyethylene polyamine.

The polyamine (AF) treatments may also be formed via multi-step condensation reaction wherein a dicarboxylic acid, such as adipic acid, is reacted with a polyalkylene amine reactant to form a polyamide followed by a reaction of the so formed polyamide with an epihalohydrin.

Also, polyamines formed via cross linking reaction with a cross linking agent may also be mentioned as exemplary. In some cases, the cross linking agent is an alkene diol. In other instances, the polyamine (AF) is a reaction product of acrylic acid or copolymer thereof with polyethylenimine.

In other exemplary embodiments, a dispersant may be added to the fluid hydrocarbon or petrochemical stream in conjunction with the polyamine (AF). For example, the dispersant may be a member selected from the group consisting of formaldehyde resins, alkyl phenol sulfides, polyalkylene succinimides and alkylene thiophosphonic acid esters. Also, a fatty acid or alkyl/alkenyl sulfonic acid may be used conjointly with the polyamine (AF) in order to improve thermodegradation of the antifoulant treatment.

Exemplary compositions in accordance with the invention comprise a polyamine and a dispersant. Also, exemplary antifoulant compositions may comprise the polyamine antifoulant (AF), and a fatty acid.

The invention is further exemplified in the appended drawing:

BRIEF DESCRIPTION OF DRAWINGS

FIG. 2 is a graph showing the antifouling performance of one polyamine antifoulant (AF) in accordance with the invention and a control (blank).

DETAILED DESCRIPTION

Figure 1:
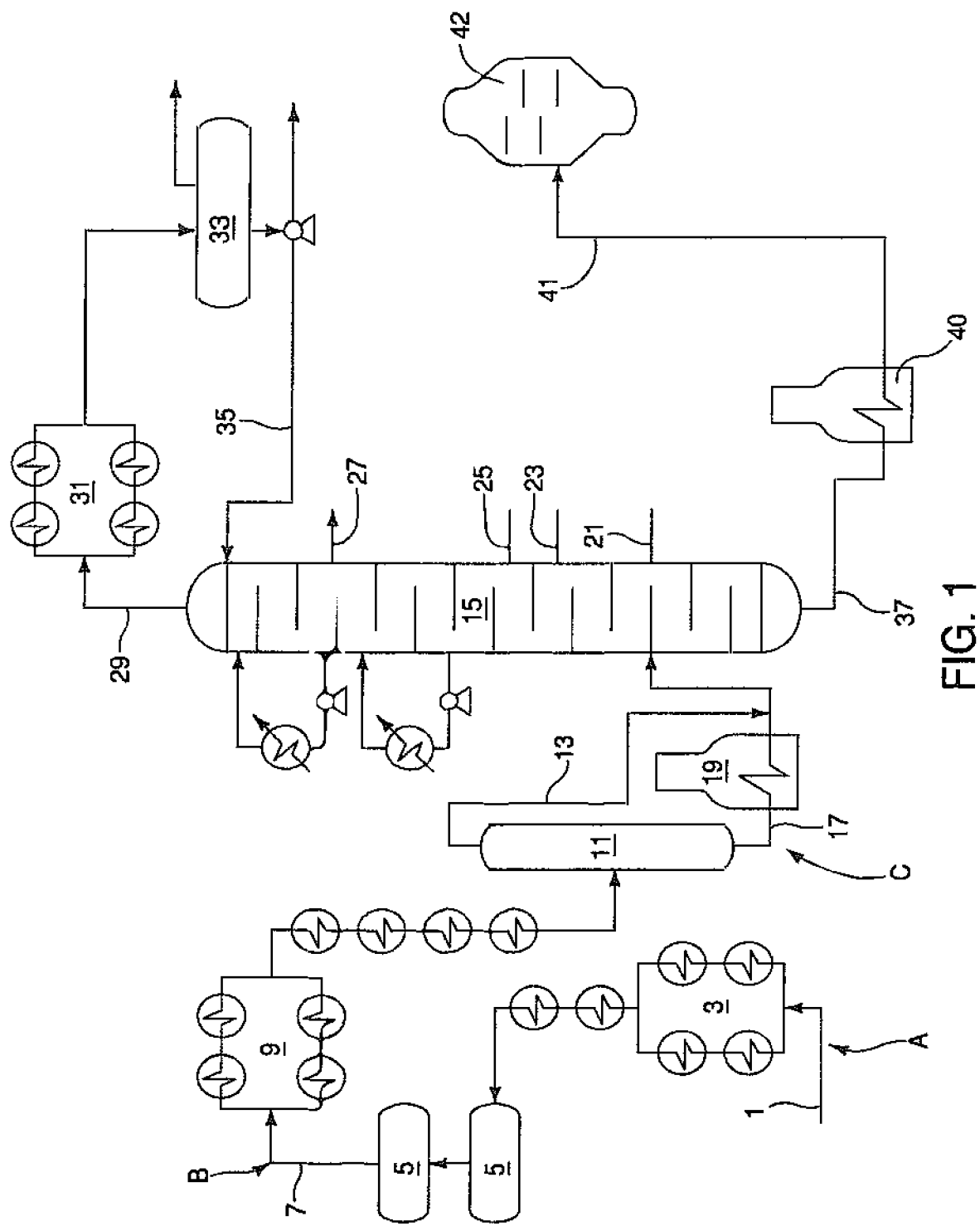
FIG. 1 is a schematic process diagram of a typical refinery process in which the polyamine AF treatment may be utilized.

It has been discovered that polyamine antifoulant (AF) treatments provide effective antifoulant performance in a variety of crude oil types or processed hydrocarbons, including the so-called tight crude oils produced from shale or tight sand formations. These antifoulants are also effective at inhibiting fouling tendencies in hydrocarbons and petrochemicals during high temperature processing. The polyamine antifoulant treatments may be added to the fluid hydrocarbon or petrochemical stream in an amount ranging from about 0.1 to about 100,000 ppm based upon one million parts by volume of the fluid hydrocarbon or petrochemical stream. Alternatively, the antifoulant treatment may be added to the fluid hydrocarbon or petrochemical stream in an amount ranging from about 50 to about 5,000 ppm.

In certain embodiments, the polyamine antifoulant treatment may be conjointly used with conventional dispersants in order to enhance antifoulant performance. Typically, these dispersants may include formaldehyde resins, alkyl phenol sulfides, alkyl phosphate phenate sulfides, Ca/Mg/Al salts of phosphate phenates, polyalkylene succinimides, alkylene thiophosphonic acid esters and others. These dispersants may be added to the liquid hydrocarbonaceous medium, such as a crude oil, or petrochemical in amounts of about 0.1 to 5,000 ppm.

Additionally, in certain embodiments the polyamine antifoulant may be used in combination with one or more fatty acids or alkyl/alkenyl sulfonic acid in order to stabilize the antifoulant performance in high temperature environments, such as those experienced at about 350° C. and higher. The fatty acids may be chosen from the group consisting of substituted and unsubstituted, saturated and unsaturated fatty acids having from about 6 to about 30 carbon atoms.

In certain embodiments, the polyamine antifoulant treatment compounds are alkylene polyamine compounds generally represented by the formula:

wherein $R_1$ is an alkylene group having from about 1 to about 10 carbon atoms and n is from about 1 to 20,000. X is H, or $NH_2$, or a hydrocarbyl group having up to 30 carbon atoms, Z is H, or $NH_2$, or a hydrocarbyl group having up to 30 carbon atoms. In some cases, X and Z, independently, may be a hydrocarbyl group having 10 or fewer carbon atoms. The resulting structures may be linear, branched, or dendrimetic. As used herein, the term "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, that is, aliphatic (e.g., alkyl or alkenyl), alicyclic (e.g., cycloalkyl, cycloalkenyl) substituents, and aromatic-, aliphatic, and alicyclic-substituted aromatic substituents, as well as cyclic substituents wherein the ring is completed through another portion of the molecule (e.g., two substituents together form a ring); substituted hydrocarbon substituents, that is, substituents containing non-hydrocarbon groups which, in the context of this invention, do not alter the predominantly hydrocarbon nature of the substituent (e.g., halo (especially chloro and fluoro), hydroxyl, carboxy, cyanato, isocyanato, ethylene oxide, propylene oxide, alkoxy, mercapto, alkylmercapto, nitro, nitroso, and sulfoxy); hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl.

One exemplary class of polyamine compounds is the ethylene polyamines such as ethylenediamine (EDA); diethylenetriamine (DETA); triethylenetetramine (TETA), triethylenepentamine (TEPA), pentaethylenehexamine (PEHA) and hexaethyleneheptamine (HEHA) compounds. Mixtures of these ethylene polyamines may also be used. The polyethylene amines such as DETA, TETRA, TEPA, PEHA, HEHA, etc. are particularly noteworthy.

Cross-linked polyamines, can also be mentioned as exemplary polyamine AF treatments. Here, polyamines, generally including at least one secondary amine, are cross-linked via reaction with traditional cross linking agents such as diols, di(meth)acrylates, bisacrylamides, divinylbenzenes, epihalohydrins (EPI), ethylenedichloride, etc. In certain aspects of the invention, alkylene polyamines such as DETA or TETA are reacted with an alkene diol such as butenediol.

For example, the polyamine may comprise a reaction product of a polyamine and EPI or ethylene dichloride (EPC) cross linking agent. As an example, branched and mixed polyamines may be cross linked by EPI or EDC. One commercially available product is the cross linked product of PEPA (polyethylenepentamine) $NH_2$ $CH_2$ $CH_2$ ($NH$ $CH_2$ $CH_2$)$_5$ $NH_2$ and EPI. In another example of a commercially available product, DETA is cross linked with EPI.

The class of EPI/amine polymers also includes those made via multi-step condensation reactions such as polyamidic formation from reaction of a dicarboxylic acid such as adipic acid with a polyalkylene amine. The resulting polyamide is then reacted with EPI.

Another noteworthy polyamine is formed from acrylic acid, maleic acid, or mixtures thereof, or their mixtures with alkylene or alkylene oxide, or copolymers thereof with ethylenimine to form aminoalkylated (e.g., aminoethylated) acryloxy functional compounds having the structure

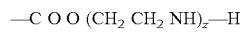

attached to the acrylic acid backbone.

Polyethylenimines (PEI) and polypropylenimines (PPI) can also be mentioned as exemplary polyamines. These commonly have molecular weights in the range of 300-2,000,000. The PEIs can also be modified by reaction with isocyanates to form isocyanate modified PEIs. One such example is PEI modified with a long chain isocyanate such as octadecyl isocyanate. Additionally, the PEIs may be reacted with propylene oxide or ethylene oxide. One commercially available material is a propylene oxide modified PEI having a molecular weight of about 1400.

Turning to FIG. 1 of the drawings, this shows a schematic hydrocarbon refining process of the type in which the polyamine AF process of the invention may be utilized. As shown in this illustrative example, crude 1 is fed through a series of heat exchangers 3 before entering the desalters 5. Typical operational temperatures for the heat exchangers 3 are on the order of about 120-150° C. Desalted crude 7 enters another series of heat exchangers 9 where it is preheated to about 200-230° C. before entering a flash drum 11 or preflash tower. The lights 13 from the flash drum may be fed directly to the distillation tower 15. The bottoms 17 from the flash drum may be fed to a direct-fired furnace 19 before they are fed to the distillation tower 15. Operating temperatures in the furnace are from about 315-370° C. and fouling in the furnace has been found significant especially in the refining of the so-called "tight oils". The distillation tower is often called an atmospheric tower as it operates slightly above atmospheric pressure, typically at around 1 to 3 atmospheres gauge.

The overhead distillation tower temperature usually ranges from 200 to 350° F. While in the tower, the crude is distilled into multiple fractions, also called "sidecuts". The sidecuts comprise heavy gas oil 21, light gas oil 23, diesel 25, and kerosene 27. The bottoms 37 exit the distillation tower for processing in the vacuum heater 40 and exit through line 41 to the vacuum tower 42. The vacuum heater typically operates at temperatures of from about 400-430° C. with temperatures in the vacuum tower usually being within the range of 300-430° C. Naphtha vapor 29 exits the top of the distillation tower and enters a series of heat exchangers 31. The naphtha vapor then enters at least one condenser 33. A portion of the condensed naptha stream is fed back into the top of the tower as reflux 35.

Some refining processes may not utilize a flash drum and instead feed crude directly to a direct-fired furnace. Likewise some operations have been omitted from FIG. 1 for the sake of brevity. These and other minor differences in crude refining processes do not affect the scope of the invention.

In certain aspects of the invention, the polyamine AF treatments can be added to the process as shown at points A, B, or C of FIG. 1. Specifically, the AF treatments are especially effective when added to or just upstream from the cold preheat train heat exchangers 3, hot crude preheat exchanges 9, or heater 19. In other embodiments, the polyamine AF can be fed upstream from the refinery in the tank farm, in the desalter feed, in the distillation feed, in the atmospheric bottoms, the vacuum heater feed, in the vacuum bottoms or in a coker feed.

In accord with some embodiments, the polyamine AF has a boiling point of greater than about 110° C. so that it will not tend to carry with the steam counter currently flowing through the atmospheric tower. In other words, the polyamine AF will tend to remain in the equipment upstream from the stripper such as in the heat exchangers 3, 9, or heater 19 wherein troublesome fouling deposits have been proven problematic, especially in conjunction with the refinery of tight oil crudes. As an example, troublesome fouling has been experienced in heater 19 which operates at temperatures of about 315-370° C.

While not being bound to any theory of operation, it is thought that the polyamine AF treatments adsorb on the surface of fouling prone molecules or colloid structures and create dispersing power by both static charge repulsion and steric effect. The fouling of the hydrocarbon is thus reduced.

The polyamine AF may be added to any fluid hydrocarbon, petroleum, petroleum production system, or petrochemical system where fouling is a concern. Examples of such systems include, but are not limited to, hydrocarbon tank farms, ships, tankers, and railway cars transporting hydrocarbons, and crude oil refineries. Specific types of units found in these systems, include, but are not limited to, hydrocarbon or petroleum storage units, heat exchangers, piping, pumps, flow meters, valves, desalters, preheat furnaces, furnaces, coker preheaters, cokers, distillation columns, fractionation columns, atmospheric columns, pipe stills, debutanizers, reactors, fluid catalytic cracking units, fluid catalytic cracking slurry settlers, hydrocracking units, steam cracking units, thermal crackling units, visbreakers, reflux units, condensers, and scrubbers.

EXAMPLES

In order to assess the antifouling efficacy of the polyamine antifoulants, a hot liquid process stimulator (HLPS) was used. The HLPS is an annular heat exchanger with a steel tube in the center that is heated to a constant temperature. Oil samples with various treatment compositions are passed once through the annulus. As fouling deposits build up on the heated tube surface, the deposits act as an insulator, resulting in a temperature drop in the oil sample at the annulus outlet. The overall heat-transfer coefficient, U, is calculated every two minutes during the test by measuring the temperatures of the oil sample at the inlet and outlet of the annulus. The U coefficient is then used to calculate the area under the various heat-transfer loss curves of the treated oil samples. These areas are then compared with the area under the heat-transfer loss curve for a control, or blank, wherein no antifoulant treatment is added. The percent reduction in fouling is determined by comparing the calculated area under the heat-transfer loss curve for a control or blank ($A_{Control}$) with the calculated area under the heat-transfer loss curve of the treated oil samples ($A_{Treat}$) as in the equation:

$$\% \text{ Reduction} = \frac{(A_{Treat} - A_{Control})}{A_{Control}} \times 100$$

Example 1

A first process of tests was performed in order to compare antifoulant (AF) efficacy of an exemplary polyamine AF against three well known dispersants. Results are given in Table 1.

TABLE 1

| Treatment | | HLPS Fouling Reduction |
|---|---|---|
| Disp 1 | 2500 ppm TA | 17.4% |
| Disp 2 | 2700 ppm TA | 16.0% |
| Disp 3 | 4500 ppm TA | 26.9% |
| Amine F | 1,000 ppm TA | 92.6% |

***
TA = true actives
Disp 1 = calcium alkylphenate sulfide
Disp 2 = alkylated succinimide blend
Disp 3 = polymeric dispersant
Amine F = polyethylenimine MW ≈ 25,000 Da Example 2

AF tests were undertaken comparing the performance of an exemplary polyamine AF in accordance with the invention, a blend of the polyamine AF and traditional dispersant, and the traditional dispersant singly. Results are shown in Table 2.

TABLE 2

| Treatment | | HLPS Fouling Reduction |
|---|---|---|
| Amine A | 1,000 ppm TA | 47.9% |
| Disp 4/Amine A blend | 700 ppm TA/300 ppm TA | 39.8% |
| Disp 4 | 1,000 ppm TA | 10.2% |

****
Amine A = ethylenediamine (EDA).
Disp 4 = polyisobutenyl ester of phosphono thioc acid Example 3

A series of tests was undertaken to demonstrate AF performance of a variety of exemplary polyamine antifoulants, blends of the polyamine antifoulants with conventional dispersants and in one instance, a conventional dispersant by itself. Results are shown in Table 3.

TABLE 3

| Treatment | | HLPS Fouling Reduction (approx.. results) |
|---|---|---|
| Amine A | 1,000 ppm TA | ≈48% |
| Amine B | 1,000 ppm TA | ≈14% |
| Amine C | 1,000 ppm TA | ≈42% |
| Amine D | 1,000 ppm TA | ≈52% |
| Amine E | 1,000 ppm TA | ≈46% |
| Amine F | 1,000 ppm TA | ≈92% |
| Disp 4 | 1,000 ppm TA | ≈10% |
| Disp 4/Amine A blend | 700 ppm TA 300 ppm TA | ≈40% |
| Disp 5/Amine D blend | 700 ppm TA 300 ppm TA | ≈38% |
| Disp 5/Amine A blend | 700 ppm TA 300 ppm TA | ≈22% |
| Disp 6/Amine A blend | 700 ppm TA 300 ppm TA | ≈25% |

\*\*\*\*
Amine B = diethylenetriamine (DETA)
Amine C = triethylenetetramine (TETA)
Amine D = tetraethylenepentamine (TEPA)
Amine E = heavy polyamine blend
Disp 5 = formaldehyde resin
Disp 6 = calcium alkyphenate sulfide Example 4

Another series of tests was undertaken to demonstrate AF performance of another exemplary polyamine, Amine G in comparison with well known dispersants. Results are shown in Table 4.

TABLE 4

| Treatment | | HLPS fouling reduction |
|---|---|---|
| Disp 1 | 2500 ppm TA | 17.4% |
| Disp 2 | 2700 ppm TA | 16.0% |
| Disp 3 | 4500 ppm TA | 26.9% |
| Amine G | 1,000 ppm TA | 63.0% |

\*\*\*\*
Amine G = butenediol crosslinked polyamine

Example 5

A series of tests was performed to assess AF efficacy and degradation reduction of a blend of one exemplary polyamine and $C_{18}$ fatty acid. The $C_{18}$ fatty acids stabilize the amine without compromising AF performance. Results are shown in Table 5.

TABLE 5

| Blend information | | | | |
|---|---|---|---|---|
| Amine F (ppm) | $C_{18}$ Fatty acid (ppm) | Disp 4 (ppm) | HLPS Fouling Reduction | Degradation Reduction <355° C. (TGA) |
|  |  |  | 0% | — |
| 250 | 0 | 750 | 86.3% | 0% |
| 250 | 80 | 750 | 83.5% | 52.2% |
| 250 | 250 | 750 | 80.4% | 73.7% |
| 250 | 750 | 750 | 88.5% | 68.0% |

In some exemplary embodiments, the polyamine AF may comprise a reaction product of an alkylene polyamine with an aldehyde, such as formaldehyde, hexaldehyde, benzaldehyde, etc. In other embodiments, the polyamine AF may comprise a reaction product of an alkylene polyamine with benzoic acid or an alkylbenzoic acid. Additionally, reaction products of alkylene polyamines with dimethylsulfate may be mentioned as an exemplary class of polyamine AF.

In another exemplary class, the polyamine AF may comprise a reaction product of an alkylene polyamine with an anhydride such as succinic anhydride, alkyl succinic anhydride, phthalic anhydride, alkyl phthalic anhydride, etc.

A further class of exemplary polyamine AFs include the reaction products of boronating agents with an alkylene polyamine. Exemplary boronating agents include boric acid and others as set forth in published U.S. Patent Application No. 2010/0038290 A1, incorporated by reference herein.

In another embodiment, the polyamine AF may comprise the reaction product of an alkylene polyamine with an isocyanate.

In certain aspects of the invention, the polyamine AF may be a reaction product of i) a polyamine reactant and ii) a second reactant such as a fatty acid, tall oil fatty acid, carboxylic acid, anhydride, or aldehyde. The polyamine reactant can be for example a polyethylenepolyamine, polyethylenimine, ethoxylated polyethylenepolyamine, polypropylenimine or the product of a reaction between a cross-linking agent (epihalohydrin, ethylene dichloride, alkane diol, etc.), and a polyamine.

Exemplary fatty acid reactants ii) include saturated and unsaturated fatty acids ($C_1$-$C_{24}$) including butyric acid ($C_4$) lauric acid ($C_{12}$), palmitic acid ($C_{16}$), and stearic acid ($C_{18}$) as examples of saturated fatty acids. Exemplary unsaturated fatty acids include oleic, linoleic, and linolenic acid.

As to the carboxylic acids that may be mentioned as exemplary reactants ii), these may include dodecylbenzenesulfonic acid (DDBSA), benzoic acid, and dodecylsufuric acid. Exemplary anhydrides ii) include polyisobutylene succinic anhydride, etc.

As mentioned above, the reactant ii) can be an aldehyde with noteworthy aldehydes including formaldehyde, dodecyl aldehyde, benzene aldehyde, etc.

The reactants i) and ii) can be treated with our without heat (for example, 0-200° C.) with or without a catalyst (for example $H_2SO_4$) in the presence or absence of a solvent, such as water, dichloromethane, dimethylforamide, etc.

As one example of a polyamine i) fatty acid ii) reaction product that can be used as an antifoulant in a hydrocarbonaceous medium, the following reaction product was prepared and tested.

Example 6

Polyethylenimine (1 part) and tall oil fatty acid (2 parts) were mixed in an aromatic solvent (3 parts) at 80° C. for two hours. The resulting reaction product was tested in the HLPS described above. FIG. 2 shows the results of this test, with the control (no additive) shown as 10, and the polyethylenimine/tall oil fatty acid reaction product antifouling performance shown at 20.

The polyamine (AF) can also be used conjointly with one or more: additional antifoulants, detergents, metal deactivators, free radical scavengers, oxygen inhibitors, etc.

A. Methods for Improving Flow Characteristics of Crude Oil

Crude oils are complex mixtures of a variety of components. These components are typically classified as comprising saturates, aromatics, resins, and asphaltenes. Asphaltenes are high molecular weight, non-crystalline polar compounds that are composed mainly of polyaromatic ring units with oxygen, nitrogen, and sulfur heteroatoms in combination with minor amounts of metals including vanadium and nickel. These asphaltenes impart high viscosity to crude oil; often agglomerating to adhere to pipeline walls impeding transport of the crude oil through the pipelines, for instance during long distance transport from production site to the refinery.

The problems associated with pipeline transport of crude oils are made even more severe in low temperature climates due to the formation of crystalline paraffin wax deposits on inner pipeline walls resulting in flow reduction and extra pumping pressure requirements. Other problems may be encountered upon the restarting of formerly shut down pipelines. In order to alleviate these flow problems, crystal wax modifiers, pour point depression aids, and viscosity reducers are used to enhance crude oil flow properties.

In accordance with one aspect of this discovery, polyamine flow improvement (FI) agents are added to the crude oil. These polyamine FI agents may be added to the crude in amounts of from about 0.1 to 10,000 ppm based upon the combined weight of the FI agent and the crude oil. The polyamine FI agent may be added to the crude, for example, prior to extraction from the well or after the crude has been extracted, during storage or in transit.

Although applicants are not to be bound to any particular theory of operation, it is thought that the polyamine FI agents act to adsorb on asphaltene particles present in the crude oil so as to inhibit agglomeration of same, thereby improving (i.e., decreasing) fluid viscosity.

In certain embodiments, the polyamine (FI) agents compounds are alkylene polyamine compounds generally represented by the formula:

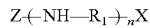

wherein $R_1$ is an alkylene group having from about 1 to about 10 carbon atoms and n is from about 1 to 20,000. X is H, or $NH_2$, or a hydrocarbyl group having up to 30 carbon atoms, Z is H, or $NH_2$, or a hydrocarbyl group having up to 30 carbon atoms. In some cases, X and Z, independently, may be a hydrocarbyl group having 10 or fewer carbon atoms. The resulting structures may be linear, branched, or dendrimetic. As used herein, the term "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, that is, aliphatic (e.g., alkyl or alkenyl), alicyclic (e.g., cycloalkyl, cycloalkenyl) substituents, and aromatic-, aliphatic, and alicyclic-substituted aromatic substituents, as well as cyclic substituents wherein the ring is completed through another portion of the molecule (e.g., two substituents together form a ring); substituted hydrocarbon substituents, that is, substituents containing non-hydrocarbon groups which, in the context of this invention, do not alter the predominantly hydrocarbon nature of the substituent (e.g., halo (especially chloro and fluoro), hydroxyl, carboxy, cyanato, isocyanato, ethylene oxide, propylene oxide, alkoxy, mercapto, alkylmercapto, nitro, nitroso, and sulfoxy); hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl.

One exemplary class of polyamine compounds is the ethylene polyamines such as ethylenediamine (EDA); diethylenetriamine (DETA); tri ethyl enetetramine (TETA), triethylenepentamine (TEPA), pentaethylenehexamine (PEHA) and hexaethyleneheptamine (HEHA) compounds. Mixtures of these ethylene polyamines may also be used. The polyethylene amines such as DETA, TETRA, TEPA, PEHA, HEHA, etc. are particularly noteworthy.

Cross-linked polyamines, can also be mentioned as exemplary polyamine FI agents. Here, polyamines, generally including at least one secondary amine, are cross-linked via reaction with traditional cross linking agents such as diols, di(meth)acrylates, bisacrylamides, divinylbenzenes, epihalohydrins (EPI), ethylenedichloride, etc. In certain aspects of the invention, alkylene polyamines such as DETA or TETA are reacted with an alkene diol such as butenediol.

For example, the polyamine FI agent may comprise a reaction product of a polyamine and EPI or ethylene dichloride (EPC) cross linking agent. As an example, branched and mixed polyamines may be cross linked by EPI or EDC. One commercially available product is the cross linked product of PEPA (polyethylenepentamine) $NH_2\ CH_2\ CH_2\ (NH\ CH_2\ CH_2)_5\ NH_2$ and EPI. In another example of a commercially available product, DETA is cross linked with EPI.

The class of EPI/amine polymers also includes those made via multi-step condensation reactions such as polyamidic formation from reaction of a dicarboxylic acid such as adipic acid with a polyalkylene amine. The resulting polyamide is then reacted with EPI.

Another noteworthy polyamine is formed from acrylic acid or copolymers thereof with ethylenimine to form aminoalkylated (e.g., aminoethylated) acryloxy functional compounds having the structure

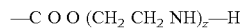

attached to the acrylic acid backbone.

Polyethylenimines (PEI) and polypropylenimines (PPI) can also be mentioned as exemplary polyamines. These commonly have molecular weights in the range of 300-70,000. The PEIs can also be modified by reaction with isocyanates to form isocyanate modified PEIs. One such example is PEI modified with a long chain isocyanate such as octadecyl isocyanate. Additionally, the PEIs may be reacted with propylene oxide or ethylene oxide. One commercially available material is a propylene oxide modified PEI having a molecular weight of about 1400.

In some exemplary embodiments, the polyamine FI may comprise a reaction product of an alkylene polyamine with an aldehyde, such as formaldehyde, hexaldehyde, benzaldehyde, etc. In other embodiments, the polyamine FI may comprise a reaction product of an alkylene polyamine with benzoic acid or an alkylbenzoic acid. Additionally, reaction products of alkylene polyamines with dimethylsulfate may be mentioned as an exemplary class of polyamine FI.

In another exemplary class, the polyamine FI may comprise a reaction product of an alkylene polyamine with an anhydride such as succinic anhydride, alkyl succinic anhydride, phthalic anhydride, alkyl phthalic anhydride, etc.

A further class of exemplary polyamine FIs include the reaction product of boronating agents with an alkylene polyamine. Exemplary boronating agents include boric acid and others as set forth in published U.S. Patent Ppplication No. 2010/0038290 A1, incorporated by reference herein.

In certain aspects of the invention, the polyamine FI may be a reaction product of i) a polyamine reactant and ii) a second reactant such as a fatty acid, tall oil fatty acid, carboxylic acid, anhydride, or aldehyde. The polyamine reactant can be for example a polyethylenepolyamine, polyethyleneimine, ethoxylated polyethylenepolyamine, polypropylenimine or the product of a reaction between a cross-linking agent (epihalohydrin, ethylene dichloride, alkane diol, etc.,) and a polyamine.

Exemplary fatty acid reactants ii) include saturated and unsaturated fatty acids ($C_1$-$C_{24}$) including butyric acid ($C_4$), lauric acid ($C_{12}$), palmitic acid ($C_{16}$), and stearic acid ($C_{18}$) as examples of saturated fatty acids. Exemplary unsaturated fatty acids include oleic, linoleic, and linolenic acid.

As to the carboxylic acids that may be mentioned as exemplary reactants ii), these may include dodecylbenzenesulfonic acid (DDBSA), benzoic acid, and dodecylsufuric acid. Exemplary anhydrides ii) include polyisobutylene succinic anhydride etc.

As mentioned above, the reactant ii) can be an aldehyde with noteworthy aldehydes including formaldehyde, dodecylaldehyde, benzene aldehyde, etc.

The reactants i) and ii) can be treated with or without heat (for example 0-200° C.) with or without a catalyst (for example $H_2SO_4$) in the presence or absence of a solvent, such as water, dichloromethane, dimethylforamide, etc.

In another embodiment, the polyamine FI may comprise the reaction product of an alkylene polyamine with an isocyanate.

B. Methods for Reducing Metal Content in Crude Oil

In another development, methods are provided for reducing the metal content in crude oil and other liquid hydrocarbonaceous media.

All crude oil contains impurities which contribute to corrosion, heat exchanger fouling, furnace coking, catalyst deactivation and product degradation in refinery and other processes. These contaminants are broadly classified as salts, bottom sediment and water (BS+W), solids, and metals. The amounts of these impurities vary depending upon the particular crude. Generally, crude oil salt content ranges between about 3-200 pounds per 1,000 barrels (ptb.).

Brines present in crude include predominantly sodium chloride with lesser amounts of magnesium chloride and calcium chloride being present. Chloride salts are the source of highly corrosive HCl, which is severely damaging to refinery tower trays and other equipment. Additionally, carbonate and sulfate salts may be present in the crude in sufficient quantities to promote crude preheat exchanger scaling.

Solids other than salts are equally harmful. For example, sand, clay, volcanic ash, drilling muds, rust, iron sulfide metal and scale may be present and can cause fouling, plugging, abrasion, erosion, and residual product contamination. As a contributor to waste and pollution, sediment stabilizes emulsions in the form of oil-wetted solids, and can carry significant quantities of oil into the waste recovery systems.

Metals in crude may be inorganic or organometallic compounds which consist of hydrocarbon combinations with arsenic, vanadium, nickel, copper, and iron. These materials promote fouling and can cause catalyst poisoning in subsequent refinery processes, such as catalytic cracking methods, and they may also contaminate finished products. The majority of the metals carry as bottoms in refinery processes. When the bottoms are fed, for example, to coker units, contamination of the end-product coke is most undesirable.

Iron content of crude oils has been increasing. It exists in crude and its products as ferric chlorides, oxides, sulfides, and oil soluble organo-acid salts such as iron naphthenates and its complexes such as iron porphyria.

After distillation, iron mostly remains in residual and heavy stocks. Its presence can poison catalysts used in hydrocarbon conversion processes such as in catalytic cracking operations. Additionally, when iron contaminated residuals are fed to other processes, such as coker units, contamination of the end product coke is undesirable. For example, in the production of high grade electrodes from coke, iron contamination of the coke can lead to electrode degradation and failure in processes such as those used in the chlor alkali industry.

Present deferrization (iron-removal) techniques include the use of desalters.

Desalting is, as the name implies, adapted to remove primarily inorganic salts from the crude prior to refining. The desalting step is provided by adding and mixing with the crude a few volume percentages of water to contact the brine and salt.

In crude oil desalting, a water in oil (W/O) emulsion is intentionally formed with the water admitted being on the order of about 4-10 volume % based on the crude oil. Water is added to the crude and mixed intimately to transfer impurities in the crude to the water phase. Separation of the phases occurs due to coalescence of the small water droplets into progressively larger droplets and eventual gravity separation of the oil and underlying water phase.

Demulsification agents are added, usually upstream from the desalter, to help in providing maximum mixing with the oil and water soluble salts. Examples of demulsification agents include Twitchell reagents, sulfonated glycerides, sulfonated oils, acetylated caster oils, ethoxylated phenol formaldehyde resins, a variety of polyester materials, and many other commercially available compounds.

Desalters are also commonly provided with electrodes to impart an electrical field in the desalter. This serves to polarize the dispersed water molecules. The so-formed dipole molecules exert an attractive force between oppositely charged poles with the increased attractive force increasing the speed of water droplet coalescence by from ten to one hundred fold. The water droplets also move quickly in the electrical field, thus promoting random collisions that further enhance coalescence.

Upon separation of the phases from the W/O emulsion, the crude is commonly drawn off the top of the desalter and sent to the fractionator tower in crude units or other refinery processes. The water phase containing water soluble metal salt compounds and sediment is discharged as effluent.

By adding an iron removal (IR) agent to the crude upstream from the desalter or in the desalter, it contacts the organic iron contaminants that are dissolved in the crude and produces products that are water soluble. Thus, these water soluble iron containing products or complexes are separated as part of the water phase discharged from the desalter unit or units. As used herein, "iron" refers to both elemental iron and iron containing compounds or complexes that may be either soluble or insoluble in the crude.

In accordance with one aspect of this development, polyethylenimines (PEIs) are used as an IR agent in liquid hydrocarbon and petrochemical media. As such, the polyethylenimine IR agent may be added to crude oil upstream from (such as in a crude settling tank) or in desalter units in order to contact the iron complexes in the crude. In some instances, the PEI is added directly to the crude, or it could be added to the wash water before or as it enters the desalter. In some cases, the PEI IR may be used in conjunction with a tandem desalter unit such as shown for example in U.S. Pat. No. 5,080,779, incorporated by reference herein.

As is common in tandem desalter systems, the bottoms water phase effluent from the downstream (second) desalter is recycled as make up water to be mixed with the crude fed into the upstream (first desalter). Also, as is usual, after resolution of the W/O emulsion in the first desalter, make up water is mixed with crude separated from the upstream desalter prior to entry of the wash water-crude admixture into the second desalter. In accordance with one aspect of this development, the PEI IR agents may be added to and mixed with the crude separated from the first (upstream) desalter. After the crude and PEI IR agent have had time for intimate mixing thereof, then the crude/PEI IR admixture is contacted with wash water prior to entry into the second (downstream) desalter.

In some embodiments, the PEI-IR agent may be added to contact the iron in the crude in an amount of about 1-100 ppm of the IR agent per one million parts of the crude. In other embodiments, the IR agent may be fed in an amount of about 10-70 ppm. From a stoichiometric perspective, the PEI-IR agent may be fed to the crude in the range of about 1-5 moles of the IR agent per mole of iron in the crude.

Although addition of the PEI-IR of the crude or the wash water feed to a desalter is discussed herein, it is to be noted that the PEI-IR could also be added directly to the crude settling tank to allow the iron to settle out of the crude prior to desalting operations.

As to the PEIs that may be used to reduce iron content of the liquid hydrocarbon or petrochemical media, commercially available PEIs have molecular weights of from about 300-70,000. The PEIs can also be modified with isocyanates to form isocyanate modified PEIs. Additionally, the PEIs may be reacted with ethylene oxide or propylene oxide. One commercially available material is a propylene oxide modified PEI having a molecular weight of about 1400.

This written description uses certain illustrative examples to disclose the invention, and to enable any person skilled in the art to practice the invention. The patentable scope of the invention is defined by the claims, and may include other examples that occur to those skilled in the art.

The invention claimed is:

1. A method of reducing fouling on at least one structural part of a system exposed to a fluid hydrocarbon or petrochemical stream comprising adding a polyamine to said fluid hydrocarbon or petrochemical stream, wherein said fluid hydrocarbon or petrochemical stream comprises a tight crude oil;

wherein said polyamine is an alkylene polyamine represented by the formula:

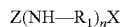

$Z(NH-R_1)_n X$ wherein $R_1$ is an alkylene group having from about 1 to about 10 carbon atoms;
n is from about 1 to about 200,000;
X is H, $NH_2$, or a hydrocarbyl group having up to 2 carbon atoms and Z is H, $NH_2$ or a hydrocarbyl group having up to 2 carbon atoms,
wherein said polyamine is added to the fluid hydrocarbon or petrochemical stream in an amount ranging from about 0.1 to about 100,000 ppm based upon one million parts by volume,
wherein said polyamine is linear, branched or cross-linked.

2. The method as recited in claim 1, wherein said polyamine is ethylenediamine or a polyethylene polyamine.

3. The method as recited in claim 2, wherein said polyethylene polyamine is a member selected from the group consisting of:
diethylenetriamine (DETA);
triethylenetetramine (TETA);
tetraethylenepentamine (TEPA);
pentaethylenehexamine (PEHA);
hexamethyleneheptamine (HEHA), and
mixtures thereof.

4. The method as recited in claim 1, wherein said polyamine is a polyethylenimine or is a reaction product of an ephihalohydrin or ethylene dichloride with an amine reactant.

5. The method as recited in claim 1, wherein said polyamine is reacted via (1) a multi-step condensation reaction wherein a dicarboxylic acid is reacted with a polyalkylene amine reactant to form a polyamide followed by reaction of said polyamide with an epihalohydrin, or a cross linking of a polyamine reactant with a cross linking agent.

6. The method as recited in claim 5, wherein said polyamine reactant comprises a polyethylene amine and said cross linking agent is an alkene diol.

7. The method as recited in claim 1, wherein said polyamine is a reaction product of acrylic acid or copolymer thereof with polyethylenimine.

8. The method of claim 1, wherein said polyamine is reacted with a reactant selected from a fatty acid, tall oil fatty acid, carboxylic acid, or anhydride, and an aldehyde.

9. The method of claim 8, wherein said polyamine reactant i) is selected from polyethylenepolyamine, polyethylenimine, ethoxylated polyethylene-polyamine or polypropylenimine.

10. The method of claim 8, wherein said reactant ii) is tall oil fatty acid and i) is polyethylenimine.

11. The method as recited in claim 1, wherein said tight crude oil comprises a crude oil produced from shale or tight sand formations.

* * * * *